US009227651B2

(12) United States Patent
Hagiwara

(10) Patent No.: US 9,227,651 B2
(45) Date of Patent: Jan. 5, 2016

(54) STEERING COLUMN

(71) Applicant: NSK LTD., Tokyo (JP)

(72) Inventor: Seiichi Hagiwara, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/397,215

(22) PCT Filed: Jan. 29, 2014

(86) PCT No.: PCT/JP2014/052005
§ 371 (c)(1),
(2) Date: Oct. 27, 2014

(87) PCT Pub. No.: WO2014/119630
PCT Pub. Date: Aug. 7, 2014

(65) Prior Publication Data
US 2015/0122074 A1    May 7, 2015

(30) Foreign Application Priority Data

Jan. 30, 2013  (JP) ................................. 2013-015312

(51) Int. Cl.
*B62D 1/18* (2006.01)
*B62D 1/185* (2006.01)
(52) U.S. Cl.
CPC ...................................... *B62D 1/185* (2013.01)
(58) Field of Classification Search
USPC .............................. 74/493; 280/775, 777, 779
See application file for complete search history.

(56) References Cited

U.S. PATENT DOCUMENTS

2006/0163861 A1* 7/2006 Higashino ...................... 280/777
2008/0196536 A1* 8/2008 Manwaring et al. ............ 74/493

(Continued)

FOREIGN PATENT DOCUMENTS

JP    49-006332 B1    2/1974
JP    S49-128520 U    11/1974

(Continued)

OTHER PUBLICATIONS

International Search Report and Written Opinion dated Mar. 11, 2014, from the corresponding PCT/JP2014/052005.

(Continued)

*Primary Examiner* — Toan To
(74) *Attorney, Agent, or Firm* — Katten Muchin Rosenman LLP

(57) ABSTRACT

A steering column for preventing separation of inner column 14a and outer column 15a is provided in the state before assembly in a vehicle body or in the state after a secondary collision without requiring additional components. The steering column includes a long engaging hole 26 extending in the axial direction and provided in the upper portion of the front section of the outer column 15a. An engaging piece 28 is integrally formed with the upper portion of the rear section of the inner column 14a, and this engaging piece 28 is moved into the long engaging hole 26 so as to be able to displace along the long engaging hole 26. When assembled in a vehicle body, as the engaging piece 28 is displaced along the long engaging hole 26, both the inner column and outer column 14a, 15a are allowed to displace relative to each other within a telescopic adjustment range. In the state before being assembled in the vehicle body, the engagement between the engaging piece 28 and the front end edge of the long engaging hole 26 prevent the inner column and outer column 14a, 15a from coming apart in the axial direction.

6 Claims, 16 Drawing Sheets

(56) References Cited

U.S. PATENT DOCUMENTS

| | | | | |
|---|---|---|---|---|
| 2008/0245176 A1* | 10/2008 | Manwaring et al. | | 74/493 |
| 2009/0205458 A1* | 8/2009 | Clark et al. | | 74/493 |
| 2010/0139439 A1* | 6/2010 | Uesaka | | 74/493 |
| 2010/0301593 A1* | 12/2010 | Sakata | | 280/775 |
| 2011/0308348 A1 | 12/2011 | Ichie et al. | | |
| 2013/0199328 A1* | 8/2013 | Yamamoto et al. | | 74/493 |
| 2014/0069223 A1* | 3/2014 | Bang | | 74/493 |
| 2014/0196564 A1* | 7/2014 | Bang et al. | | 74/493 |
| 2014/0251061 A1* | 9/2014 | Moriyama | | 74/493 |
| 2014/0318302 A1* | 10/2014 | Watanabe | | 74/493 |

FOREIGN PATENT DOCUMENTS

| | | |
|---|---|---|
| JP | 56001879 U | 1/1981 |
| JP | 57-65169 U | 4/1982 |
| JP | 52-155609 U | 9/1984 |
| JP | H05-084917 U | 11/1993 |
| JP | 11-278283 A | 10/1999 |
| JP | 2004-009920 A | 1/2004 |
| JP | 2004-066944 A | 3/2004 |
| JP | 2005-75183 A | 3/2005 |
| JP | 2008-279792 A | 11/2008 |
| JP | 2009-292306 A | 12/2009 |
| JP | 2010-189003 A | 9/2010 |
| JP | 2010189003 A | 9/2010 |
| JP | 2011-011576 A | 1/2011 |
| JP | 2011011576 A | 1/2011 |
| JP | 2011-021358 A | 2/2011 |
| JP | 2012001189 A | 1/2012 |

OTHER PUBLICATIONS

Office Action dated Mar. 24, 2015, from corresponding Japanese Application No. 2014-513856.

Office Action dated Feb. 3, 2015, from corresponding Japanese Application No. 2014-092268.

Office Action dated Feb. 24, 2015, from corresponding Japanese Application No. JP2014-092269.

* cited by examiner (a)

(b)

STEERING COLUMN

TECHNICAL FIELD

The present invention relates to a steering column of a steering apparatus, and particularly to a steering column of a telescopic steering apparatus, the forward-backward position of which can be adjusted according to the size and operating posture of a driver.

BACKGROUND ART

As illustrated in FIG. 17, the steering apparatus for a vehicle is constructed so as to transmit rotation of a steering wheel 1 to an input shaft 3 of a steering gear unit 2, to push or pull a pair of left and right tie rods 4 as the input shaft 3 rotates, and thus to apply a steering angle to the front wheels. The steering wheel 1 is supported by and fastened to the rear end section of a steering shaft 5, and the steering shaft 5 is inserted in the axial direction through a cylindrical shaped steering column 6 and is supported by the steering column 6 so as to be able to rotate freely. The front end section of the steering shaft 5 is connected to the rear end section of an intermediate shaft 8 by way of a universal joint 7, and the front end section of the intermediate shaft 8 is connected to the input shaft 3 by way of another universal joint 9. In the example illustrated in the figures, an electric assist apparatus that reduces the operating force for operating the steering wheel 1 is assembled. Specifically, an electric motor 10 that functions as a power source for applying auxiliary power is supported by a housing 11 that is fastened to the front end section of the steering column 6. The output torque of the electric motor 10 is applied to the steering shaft 5 by way of a gear unit or the like that is provided inside the housing 11. Here, the forward-backward direction, left-right direction (width direction) and the up-down direction correspond to each of the directions of the vehicle unless otherwise noted.

The steering apparatus that is illustrated in FIG. 17 is a tilt and telescopic steering apparatus that comprises both a tilting mechanism for adjusting the up-down position of the steering wheel 1, and a telescopic mechanism for adjusting the forward-backward position of the steering wheel 1 in accordance to the size and operating posture of the driver. More specifically, the steering column 6 is supported by the vehicle body 12 so as to be able to pivotally displace around a pivot shaft 13 that is installed in the left-right direction. The steering column 6 is constructed by fitting together the rear section of an inner column 14 and the front section of an outer column 15, or in other words, by fitting the tip end sections of the inner column 14 and outer column 15 so as to displace relative to each other in the axial direction. The steering shaft 5 is constructed by fitting together with a spline joint the rear section of an inner shaft 16 that is supported on the inner diameter side of the inner column 14 so as to only be able to rotate, and the front section of an outer shaft 17 that is supported in the inner diameter side of the outer column 15 so as to only be able to rotate, such that torque can be transmitted and so that relative displacement in the axial direction is possible. A displacement bracket 18 that is fastened to the outer column 15 is supported by a support bracket 19 that is supported by the vehicle body 12 so as to be able to displace in the up-down direction and forward-backward direction.

A long hole 20 for telescopic adjustment that extends in the axial direction of the outer column 15 is formed in the displacement bracket 18. A support bracket 19 comprises a pair of support plates 21 that hold the displacement bracket 18 from both the left and right sides. Long holes 22 for tilt adjustment that extend in the up-down direction are formed in portions of these support plates 21 that are aligned with each other. An adjustment rod 23 is inserted through the long holes 22 for tilting adjustment and the long hole 20 for telescopic adjustment. The adjustment rod 23 comprises a pair of pressure sections that hold the pair of support plates 21 from both the left-right sides, and an expansion and contraction apparatus that operates according to the operation of an adjustment lever (not illustrated in the figure) is able to expand or contract the space between these pressure sections.

When adjusting the up-down position or forward-backward position of the steering wheel 1, the adjustment lever is rotated in a specified direction around the adjustment rod 23, which expands the space between the pair of pressure sections provided on the adjustment rod 23. As a result, friction force that acts between the inside surfaces of the support plates 21 and both side surfaces of the displacement bracket 18 decreases. In this state, it is possible to adjust the position of the steering wheel 1 within the range that the adjustment rod 23 is able to displace inside the long holes 22 for tilt adjustment, and the long hole 20 for telescopic adjustment. After adjustment, the adjustment lever is rotated in the opposite direction, which contracts the space between the pair of pressure sections provided on the adjustment rod 23. As a result, friction force that acts between the inside surfaces of the support plates 21 and both side surfaces of the displacement bracket 18 increases, and the steering wheel 1 is maintained in the adjusted position.

In the steering apparatus illustrated in FIG. 17, in the state when the apparatus is assembled in the vehicle body 12 (normal state), the range in which relative displacement in the axial direction between the inner column 14 and outer column 15 is possible is regulated by the telescopic adjustment range (range in which the adjustment rod 23 is able to displace inside the long hole 20 for telescopic adjustment).

On the other hand, in the state before assembly in the vehicle body 12, or in the state in which the support bracket 19 has become separated from the vehicle body 12 due to a secondary collision, the support bracket 19 is able to displace together with the outer column 15, so the range in which relative displacement in the axial direction between the inner column 14 and outer column 15 is possible is no longer restricted by the telescopic adjustment range. Therefore, there is a possibility that the inner column 14 and outer column 15 will undergo excessive relative displacement in the extending direction of the steering column 6.

In addition to the construction illustrated in FIG. 17, construction of a telescopic steering apparatus has also been conventionally known in which the front section of the outer column that fits around the outside of the rear section of the inner column is a partial cylindrical shape, and by rotating the adjustment lever in a specified direction, the diameter of the front section of the outer column is reduced, increasing the surface pressure between the inner circumferential surface of the front section of the outer column and the outer circumferential surface of the rear section of the inner column. In this construction, even in the state before assembly in the vehicle body, or in the state in which the support bracket has become separated from the vehicle body due to a secondary collision, relative displacement in the axial direction between the inner column and the outer column is prevented by the surface pressure between the inner circumferential surface of the front section of the outer column and the outer circumferential surface of the rear section of the inner column. However, when the adjustment lever is rotated in the opposite direction, and the surface pressure between the inner circumferential surface of the front section of the outer column and the outer circumferential surface of the rear section of the inner column is reduced, relative displacement between the inner column and the outer column becomes possible, and there is a possibility that there will be excessive relative displacement in the extending direction of the steering column.

Particularly, in the state before assembly in the vehicle body, when the inner column and outer column undergo excessive relative displacement in the axial direction and the tip end sections thereof become separated from each other, extra time is then required to reassemble the inner column and outer column. In JP 2012-001189 (A), construction of a steering column is disclosed in which the inner column and outer column are prevented from separation by connecting the inner column and outer column using a connecting wire. By employing this kind of construction, the inner column and outer column are prevented from undergoing excessive relative displacement in the axial direction. However, in this kind of construction, a connecting wire becomes necessary, so there is an increase in cost due to the increase in the number of parts.

RELATED LITERATURE

Patent Literature

[Patent Literature 1] JP 2012-001189 (A)

SUMMARY OF INVENTION

Problem to be Solved by Invention

Taking into consideration the problem described above, the object of the present invention is to achieve a steering column that is capable of preventing excessive relative displacement in the axial direction between a front side column and a rear side column in the state before assembly in a vehicle body or in the state after a secondary collision without requiring additional components.

Means for Solving Problems

The steering column of the present invention comprises: a front side column and a rear side column; and the steering column is constructed by fitting together the rear section of the front side column, which is the tip end section thereof, and the front section of the rear side column, which is the tip end section thereof, so that relative displacement in the axial direction is possible; in a state that the steering column is assembled in a vehicle body (during normal state), the range in which the front side column and the rear side column can displace relative to each other in the axial direction is regulated to a telescopic adjustment range, that is a specified range; and in a state before the steering column is assembled in the vehicle body, or in a state after a secondary collision, excessive relative displacement in the axial direction between the front side column and the rear side column is prevented by the end edge on the tip end side (rear end side in the case of the front side column, or front end side in the case of the rear side column) of a long engaging hole that is provided in the tip end section of one of the front side column and rear side column (rear section of the front side column, or front section of the rear side column) engaging with an engaging piece that is provided on the tip end section of the other of the front side column and rear side column (front section of the rear side column, or rear section of the front side column). The tip end side, in both the front side column and rear side column, means the fitting side, or in other words, the rear end side of the front side column, and the front end side of the rear side column; and the base end side means the front end side of the front side column, and the rear end side of the rear side column.

In the steering column of the present invention, there are four embodiments: 1) construction in which the front side column is the inner column and the engaging piece is provided on the rear section on the tip end side of the inner column, and the rear side column is the outer column and the long engaging hole is provided on the front section on the tip end side of the outer column; 2) construction in which the front side column is the inner column and the long engaging hole is provided on the rear section on the tip end side of the inner column, and the rear side column is the outer column and the engaging piece is provided on the front section on the tip end side of the outer column; 3) construction in which the front side column is the outer column and the long engaging hole is provided on the rear section on the tip end side of the outer column, and the rear side column is the inner column and the engaging piece is provided on the front section on the tip end side of the inner column; and 4) construction in which the front side column is the outer column and the engaging piece is provided on the rear section on the tip end side of the outer column, and the rear side column is the inner column and the long engaging hole is provided on the front section on the tip end side of the inner column.

More specifically, the long engaging hole is formed in the tip end section of one of the front side column and rear side column (rear section of the front side column, or the front section of the rear side column) so as to extend in the axial direction. On the other hand, the engaging piece comprises a protruding section that protrudes in the radial direction from the circumferential surface on the side of the one of the front side column and rear side column of the tip end section of the other of the front side column and rear side column. In other words, the protruding section protrudes toward the side of the one of the front side column and rear side column. The protruding section moves into the long engaging hole so as to be able to displace along the long engaging hole within the specified telescopic adjustment range. The protruding section is able to engage with the end edge on the tip end side of the long engaging hole, and by the protruding section engaging with the end edge on the tip end side of the long engaging hole, the front side column and the rear side column are prevented from excessive relative displacement in the axial direction that exceeds the telescopic adjustment range.

Preferably, a receiving hole is formed in the tip end section of the other of the front side column and rear side column (front section of the rear side column, or rear section of the front side column). The engaging piece is continuous with part of the inner peripheral edge of the receiving hole, and in this state, is integrally provided with the tip end section of the other of the front side column and rear side column. An inclined section is provided on part of the tip end side of the protruding section and is inclined such that the protruding amount in the radial direction from the receiving hole becomes smaller going toward the tip end side. Moreover, an engaging section is provided on part of the base end side of the protruding section so as to be able to engage with the end edge on the tip end side of the long engaging hole. Furthermore, the engaging piece is constructed so that the protruding section is able to move out of the way into the receiving hole due to elastic deformation. Here, the tip end side and the base end side mean the tip end side and base end side of the front side column or rear side column.

In this case, the end edge on the base end side of the protruding section is inclined with respect to a virtual plane that is orthogonal to the axial direction of the rear side column, and the engaging section of the protruding section comes in linear contact instead of surface contact when engaging with the end edge on the tip end side of the long engaging hole.

Additionally or alternatively, the engaging piece is preferably formed by bending a portion that is formed on the tip end section of the other of the front side column and rear side column (front section of the rear side column, or rear section of the front side column) and that is surrounded on three sides by a U-shaped cut or through hole that is opened in the tip end side. In this case, the end edge on the tip end side of the engaging piece is joined with the end edge on the tip end side of the inner peripheral edge of the long engaging hole. Here as well, the tip end side and the base end side mean the tip end side and base end side of the front side column or rear side column.

The telescopic steering apparatus of the present invention comprises: a steering column, a steering shaft, a displacement bracket, a support bracket, and adjustment rod, a pair of pressure sections, and an adjustment lever.

The steering shaft is supported on the inner diameter side of the steering column so as to be able to rotate freely, and in this state, a steering wheel can be supported by and fastened to the rear end section of the steering shaft that protrudes from a rear end opening of the steering column; this steering shaft being constructed by fitting the rear section of a front side shaft that is supported on the inner diameter side of the front side column so as to only be able to rotate with the front section of a rear side shaft that is supported on the inner diameter side of the rear side column so as to only be able to rotate, so that torque can be transmitted and so that relative displacement in the axial direction is possible.

The displacement bracket is fastened to part of the rear side column and comprises a long hole for telescopic adjustment that penetrates the displacement bracket in the width direction, and extends in the axial direction of the rear side column.

The support bracket is supported by a vehicle body, and comprises a pair of support plates that hold the displacement bracket from both sides in the width direction, and a pair of through holes that are provided in portions of the pair of support plates that are aligned with each other.

The adjustment rod is arranged in a state so as to be inserted in the width direction through the pair of through holes and the long hole for telescopic adjustment. The pair of pressure sections are provided on portions of both end sections of the adjustment rod that protrude from the outside surfaces of the pair of support plates. The adjustment lever is provided on one end of the adjustment rod, and increases or decreases the space between the pair of pressure sections by rotating around the adjustment rod, or rotating together with the adjustment rod.

In the telescopic steering apparatus of the present invention, when the space between the pair of pressure sections is increased, the range in which the adjustment rod is able to displace inside the long holes defines the telescopic adjustment range.

Effect of Invention

In the case of the steering column of a telescopic steering apparatus of the present invention, there is no increase in the number of parts, and when assembled in a vehicle body, the front side column and rear side column of the steering column are not obstructed from relative displacement within the telescopic adjustment range, and in the state before assembly in a vehicle body or in the state after a secondary collision, the front side column and rear side column are prevented from excessive relative displacement.

In other words, in the state before assembly in a vehicle body, or in the state after a secondary collision, the front side column and the rear side column are capable of relative displacement in the axial direction exceeding the telescopic adjustment range. In the present invention, even in states such as these, due to the engagement between the protruding section of the engaging piece and the end edge on the tip end side of the long engaging hole, relative displacement between the front side column and the rear side column in the lengthwise direction (axial direction) of the steering column is regulated. On the other hand, in the state when assembled in a vehicle body, displacement of the protruding section of the engaging section along the long engaging hole allows relative displacement between the front side column and the rear side column within the telescopic adjustment range.

In one embodiment of the present invention, the engaging long hole is integrally formed in one of the rear section of the front side column and the front section of the rear side column, and the engaging piece is integrally formed in the other of the rear section of the front side column and the front section of the rear side column. Therefore, it is possible to prevent an increase in the number of parts and the number of assembly steps for providing this kind of engagement structure.

BRIEF DESCRIPTION OF DRAWINGS

FIG. 9A(b) is a view of that engaging piece as seen from above; FIG. 9B(a) is a partial cross sectional view of an engaging piece that is formed from the inside portion of a U-shaped through hole; and FIG. 9B(b) is a view of that engaging piece as seen from above.

MODES FOR CARRYING OUT INVENTION

First Example

Figure 1:
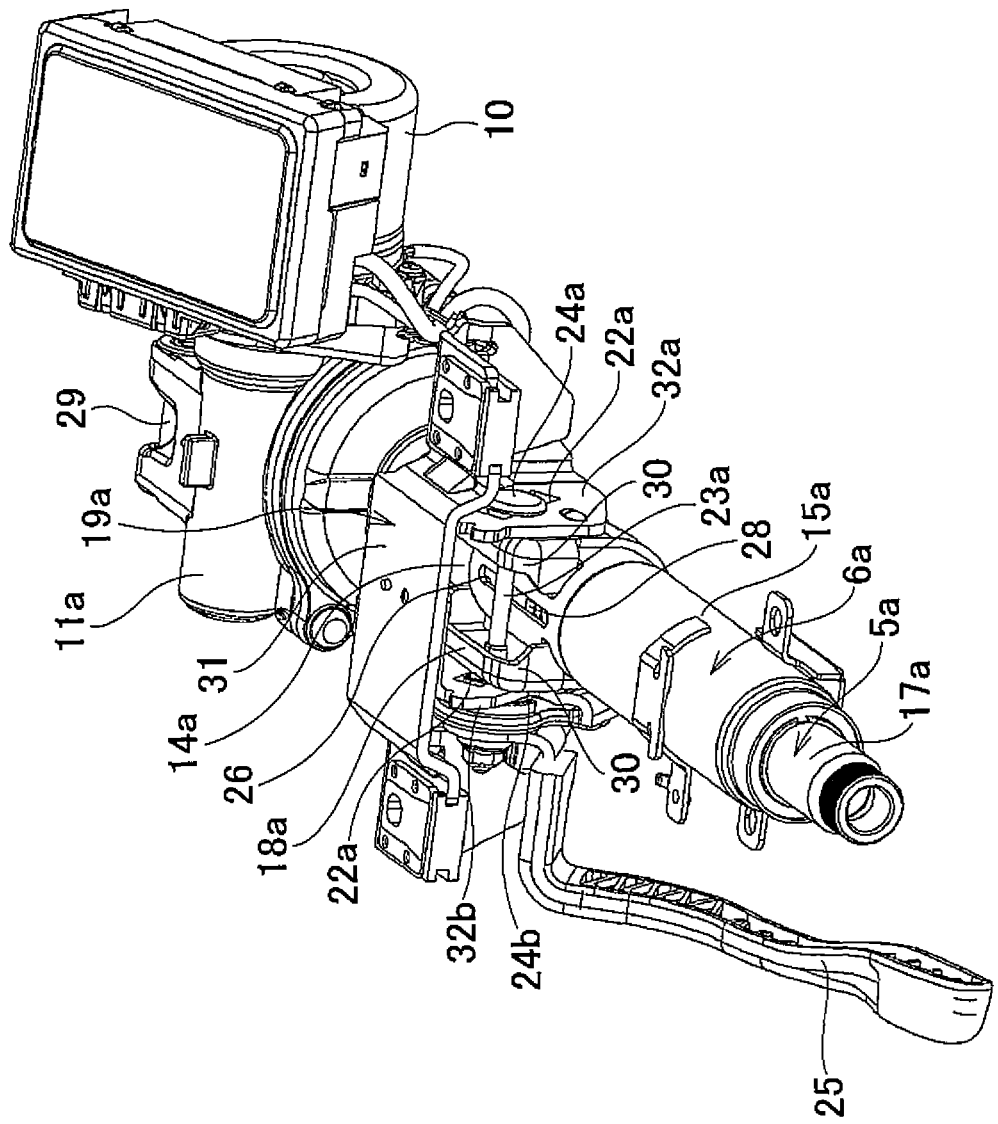
FIG. 1 is a perspective view of a steering apparatus of a first example of an embodiment of the present invention as seen from the upper rear.
Figure 2:
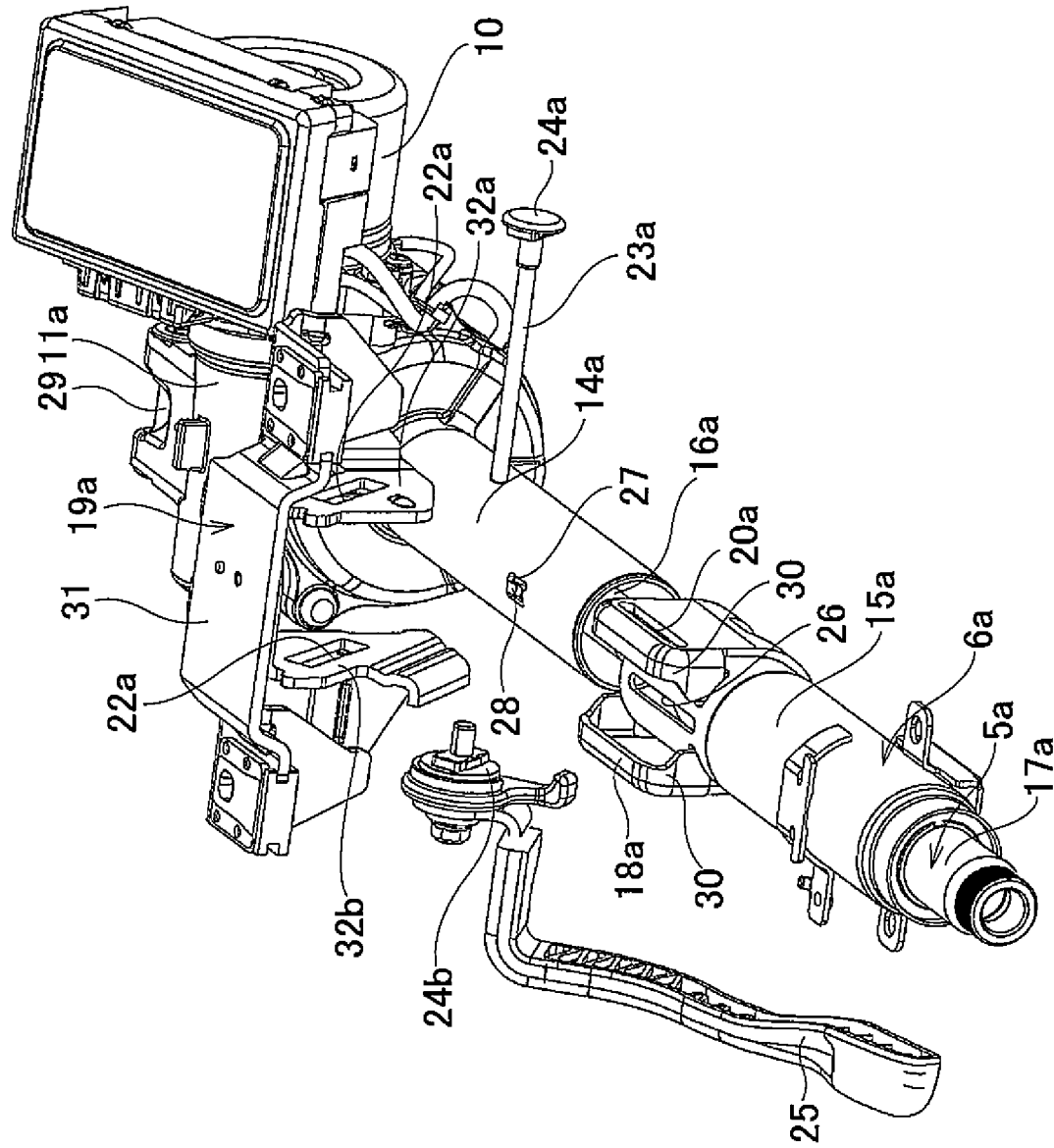
FIG. 2 is an exploded perspective view of the steering apparatus in FIG. 1.

FIG. 1 to FIG. 9C illustrate a first example of an embodiment of the present invention. The telescopic steering apparatus of this example, in addition to a telescopic mechanism, comprises a tilt mechanism. The telescopic steering apparatus of this example comprises: a steering column 6a, a displacement bracket 18a, a steering shaft 5a, a support bracket 19a, an adjustment rod 23a, a pair of pressure sections 24a, 24b, and an adjustment lever 25.

The steering column 6a comprises: a cylindrical shaped inner column 14a as a front side column; and a cylindrical outer column 15a as a rear side column; and is constructed by fitting the front section of the outer column 15a around the rear section of the inner column 14a, or in other words, by fitting the tip end sections of these columns 14a, 15a together such that relative displacement in the axial direction is possible. In this example, the rear end side of the inner column 14a and the front end side of the outer column 15a are the tip end sides, and the front end side of the inner column 14a and the rear end side of the outer column 15a are the base end sides.

The inner column 14a and the outer column 15a are manufactured using a metal material having elasticity, such as an iron alloy or an aluminum alloy. However, as long as it is possible to maintain the function desired for the steering column, the material used is not particularly limited. It is also possible for the material of the inner column 14a and the outer column 15a to be different. A housing 11a for installing components of an electric assist apparatus such as an electric motor 10a, reduction gear or the like is connected and fastened to the front end section of the inner column 14a. A support tube 29 is arranged in the width direction on the front end of the upper portion of the housing 11a. The housing 11a is supported by the vehicle body by a pivot shaft such as a bolt or the like (not illustrated in the figure) that is inserted through the support tube 29 so as to be able to pivotally displace.

The displacement bracket 18a is fastened to a portion (upper portion on the front side) of the outer column 15a. In this example, the displacement bracket 18a comprises a pair of supported pieces 30 that are separated in the width direction. Long holes 20a for telescopic adjustment penetrate through the pair of supported pieces 30 in positions that are aligned with each other, so as to extend in the axial direction of the outer column 15a.

Figure 17:
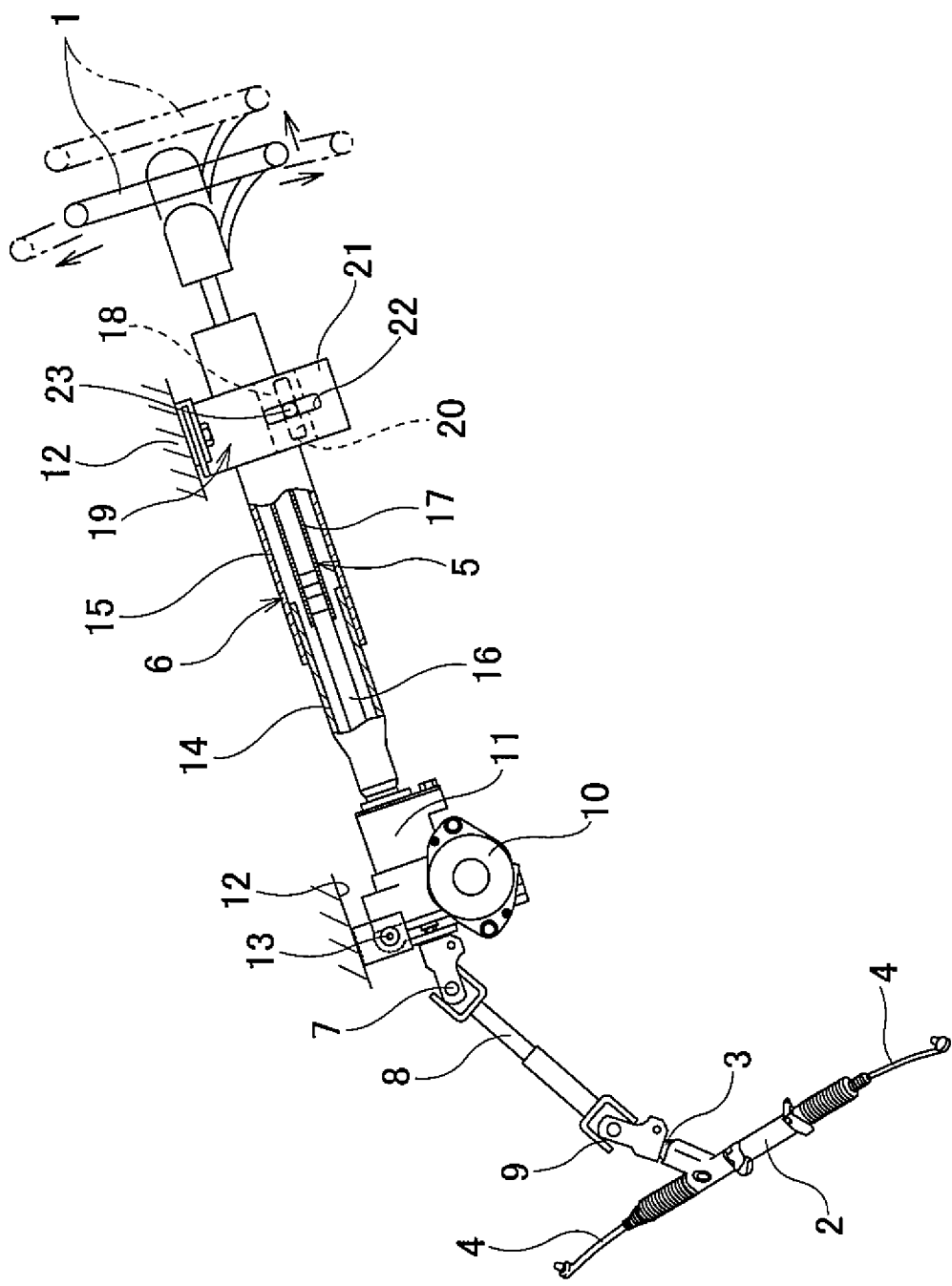
FIG. 17 is a partial cross sectional side view illustrating an example of a conventional steering apparatus.

The steering shaft 5a is constructed by fitting the front section of an outer shaft 17a as the rear side shaft around the outside of the rear section of an inner shaft 16a as a front side shaft with a spline joint so that torque can be transmitted and so that displacement in the axial direction is possible. The inner shaft 16a is supported on the inner diameter side of the inner column 14a and the outer shaft 17a is supported on the inner diameter side of the outer column 15a by rolling bearings such as single-row deep-groove ball bearings that are able to support both radial loads and thrust loads, directly or by way of another member so that only rotation is possible. Therefore, the steering shaft 5a is able to extend or contract according to extension or contraction of the steering column 6a. A steering wheel 1 (see FIG. 17) is supported by and fastened to a portion on the rear end section of the outer shaft 17a that protrudes further toward the rear than the opening on the rear end of the outer column 15a.

The support bracket 19a comprises an installation plate section 31 that is supported by the vehicle body, and a pair of support plate sections 32a, 32b that hang down from the bottom surface of the installation plate section 31 and are near parallel with each other. A pair of long holes 22a for tilt adjustment that correspond to through holes of the present invention, are formed in a partial arc shape that is centered around the pivot shaft that is inserted through the support tube 29 in portions of the pair of support plate sections 32a, 32b that are aligned with each other. The support bracket 19a is supported by the vehicle body in a state such that normally the steering column 6a can be held with sufficient rigidity, and so that the steering column 6a can break away toward the front by an impact load that is applied during a secondary collision.

An adjustment rod 23a is arranged in a state so as to be inserted in the width direction through the long holes 20a for telescopic adjustment and the long holes 22a for tilt adjustment. A pair of pressure sections 24a, 24b are provided on portions on both end sections of the adjustment rod 23a that protrude from the outside surfaces of the pair of support plate sections 32a, 32b. An adjustment lever 25 is provided on one end section of the adjustment rod 23a, and is constructed such that by rotating the adjustment lever 25 centered around the adjustment rod 23a, or by rotating the adjustment lever 25 together with the adjustment rod 23a, the space between the pair of pressure sections 24a, 24b is increased or reduced. Various constructions such as a cam apparatus comprising a drive side cam and a driven side cam, and a screw apparatus comprising a bolt and nut can be applied as the expansion and contraction apparatus for increasing or reducing the space between the pair of pressure sections 24a, 24b by the adjustment lever 25.

A long engaging hole 26 that extends in the axial direction is formed in a portion in the center section in the width direction on the top side of the front section of the outer column 15a that is located between the supported pieces 30. Moreover, a rectangular receiving hole 27 is formed in the center section in the width direction on the top side of the rear section of the inner column 14a. An engaging piece 28 is integrally provided with the inner column 14a such that the rear end edge thereof (end edge on the tip end side of the inner column 14a) is connected to the rear end edge of the peripheral edge of the receiving hole 27 (end edge on the tip end side of the inner column 14a). In this example, the front section of the outer column 15a corresponds to one of the rear section of the front side column and the front section of the rear side column of the present invention, and the rear section of the inner column 14a corresponds to the other of the rear section of the front side column and the front section of the rear side column of the present invention. Moreover, in this example, the engaging piece 28 is formed into an arc-plate shape so that, together with extending forward in the axial direction of the inner column 14a from the rear end edge of the receiving hole 27, the rear half (half on the tip end side of the inner column 14a) is convex shaped downward a little, the front half (half on the base end side of the inner column 14a) is convex shaped upward, and the front end section (end section on the base end side of the inner column 14a) is curved a little toward the inside.

The portion of the convex front half of the engaging piece 28 constitutes a protruding section 33 that protrudes from the inside of the receiving hole 27 to the outer diameter side, which is the outer column 15a side. In other words, the protruding section 33 protrudes in the radial direction from the outer peripheral surface on the outer column 15a side of the inner column 14a toward the outer column 15a. The portion on the rear end side of the top surface of the protruding section 33 (part of the tip end side of the inner column 14a) constitutes an inclined section 34 that is inclined in a direction such that the amount of protrusion from the receiving hole 27 decreases going toward the rear end side (tip end side of the inner column 14a). The portion of the front end edge of the engaging piece 28 (part of the base end side of the inner column 14a) that corresponds to the front end edge of the protruding section 33 (portion that protrudes from the receiving hole 27 toward the outer diameter side) constitutes an engaging section 35. The engaging piece 28 can elastically deform, and due to that elastic deformation, the protruding section 33 is able to move out of the way into the receiving hole 27. With the front section of the outer column 15a fitted around the outside of the rear section of the inner column 14a, the protruding section 33 of the engaging piece 28 enters into the long engaging hole 26 and is able to displace along the long engaging hole 26.

In this example, the engaging piece 28 is formed in the center in the width direction of the top side of the rear section of the inner column 14a, and is formed by bending a portion that is surrounded on three sides by a U-shaped through hole or cut opened on the rear end side (tip end side) of the inner column 14a. The process for forming the through hole or cut, and the bending process can be performed in succession or can be performed simultaneously. In either case, in this example, the receiving hole 27 is formed when forming the engaging piece 28.

The work of moving the protruding section 33 of the engaging piece 28 into the long engaging hole 26 can be performed in one process at the same time as the work for assembling the steering column 6a. In other words, in this example, when assembling the steering column 6a, the protruding section 33 of the engaging piece 28 that is provided on the rear section of the inner column 14a is arranged such that the phase in the circumferential direction corresponds with that of the long engaging hole 26 that is provided on the front section of the outer column 15a, and in that state, the rear end section (tip end section) of the inner column 14a and the front end section (tip end section) of the outer column 15a are fitted together in the axial direction. Next, the inner column 14a and the outer column 15a are displaced relative to each other in a direction such that the dimension in the axial direction of the portion fitted together is increased. As a result, as illustrated in FIG. 8A, the front end edge (tip end edge) of the outer column 15a comes in contact with the inclined section 34 of the protruding section 33. In this state, by continuing the relative displacement between the inner column 14a and the outer column 15a, as the inclined section 34 is pressed in the axial direction by the front end edge of the outer column 15a, the protruding section 33 is elastically moved inside the receiving hole 27 as illustrated in FIG. 8B. In this state, as the relative displacement between the inner column 14a and the outer column 15a is even further continued, the front end section of the outer column 15a passes the outer diameter side of the protruding section 33, and after that, at the instant that the protruding section 33 becomes aligned with the front end section (tip end section) of the long engaging hole 26, the engaging piece 28 is elastically restored as illustrated in FIG. 8C, and the protruding section 33 moves into the long engaging hole 26. In this example, the engaging piece 28 is formed into an arc-plate shape such that the rear half is convex shaped a little toward the bottom side, the front half is convex shaped toward the top side, and the front end section is bent a little toward the inside, so the engaging piece 28 easily deforms elastically, and the front end section of the outer column 15a is able to easily pass the outer diameter side of the protruding section 33.

In this example, the width of the long engaging hole 26 and the width of the engaging piece 28 are set so that the width of the long engaging hole 26 is a little larger than the width of the engaging piece 28. As a result, relative rotation between the inner column 14a and the outer column 15a is practically prevented. Moreover, in the state in which the engaging piece 28 is elastically restored, the outer diameter of the protruding section 33 is at least less than the outer diameter of the front section of the outer column 15a (portion where the long engaging hole 26 is formed), and the protruding section 33 does not stick out from the inside of the long engaging hole 26 toward the outer diameter side of the outer column 15a. Therefore, during normal operation, when the inner column 14a and the outer column 15a are relatively displaced within the range of telescopic adjustment, the protruding section 33 does not hit other parts and hinder the displacement. Moreover, the front end section of the engaging piece 28 is bent a little toward the inside, or in other words, is inclined a little with respect to a virtual plane that orthogonally crosses the axial direction of the steering column 6a. Therefore, when the inner column 14a and the outer column 15a relatively displace, the engaging section 35 on the front end section (part of the base end side of the inner column 14a) of the protruding section 33 of the engaging piece 28 comes in linear contact instead of surface contact with the edge of the end on the front end side (tip end side of the outer column 15a) of the edges of both ends in the lengthwise direction of the long engaging hole 26, and thus the engaging section 35 that is constructed by the front end edge (base end edge) of the engaging piece 28 easily bites into the edge of the end on the front end side of the long engaging hole 26. Therefore, it becomes difficult for the engagement between the front end edge (engaging section 35 of the protruding section 33 of the engaging piece 28 and the front end edge of the long engaging hole 26 to come apart, and thus the excessive relative displacement between the inner column 14a and the outer column 15a due to the separation of this engagement is prevented.

As illustrated in FIG. 9A, in the case in which the engaging piece 28 is formed by performing bending of a portion that is surrounded on three sides by a U-shaped cut 36 that is formed in the inner column 14a, when elastically moving the engaging piece 28 out of the way inside the receiving hole 27, there is a possibility that the outer peripheral edge of the engaging piece 28 and the inner peripheral edge of the receiving hole 27 will catch on each other due to burrs or the like, thus hindering the movement. Therefore, preferably processing such as deburring is performed on the outer peripheral edge of the engaging piece 28 and the inner peripheral edge of the receiving hole 27. On the other hand, as illustrated in FIG. 9B, in the case in which the engaging piece 28 is formed by performing bending of a portion that is surrounded on three sides by a U-shaped through hole 37 that is formed in the inner column 14a, there is a sufficient gap between the outer peripheral edge of the engaging piece 28 and the inner peripheral edge of the receiving hole 27. Therefore, when elastically moving the engaging piece 28 out of the way inside the receiving hole 27, the outer peripheral edge of the engaging piece 28 and the inner peripheral edge of the receiving hole 27 do not catch on each other due to burrs or the like, so moving the engaging piece 28 out of the way can be performed smoothly. However, in this case as well, it is possible to perform a process such as deburring on the outer peripheral edge of the engaging piece 28 and the inner peripheral edge of the receiving hole 27.

In this example, when adjusting the forward-backward position or the up-down position of the steering wheel 1, the space between the pressure sections 24a, 24b is increased by rotating the adjustment lever 25 in a specified direction (normally, downward). As a result, the surface pressure at the areas of contact between both side surfaces of the displacement bracket 18a and the inside surfaces of the pair of support plates 32a, 32b is decreased or lost. In this state, it is possible to adjust the position of the steering wheel 1 within the range that the adjustment rod 23a is able to displace inside the long holes 20a for telescopic adjustment and the pair of long holes 22a for tilt adjustment. Then, after the position of the steering wheel has been adjusted, the space between the pressure sections 24a, 24b is reduced by rotating the adjustment lever 25 in the opposite direction (normally, upward). As a result, the surface pressure at the areas of contact between the both side surfaces of the displacement bracket 18a and the inside surfaces of the pair of support plates 32a, 32b is increased, and it is possible to maintain the steering wheel 1 at the adjusted position. In this example, the telescopic adjustment range is the range in which the adjustment rod 23a is able to displace inside the long holes 20a for telescopic adjustment in the state in which the surface pressure at the areas of contact is decreased or lost.

In the telescopic steering apparatus of this example, there is not an increase in parts or assembly steps, and when assembled in the vehicle body, the inner column 14a and outer column 15a are not hindered from relative displacement within the telescopic adjustment range, and in the state before being assembled in the vehicle body or in the state after the support bracket 19a has broken away in the forward direction from the vehicle body due to a secondary collision, the inner column 14a and outer column 15a are prevented from excessive relative displacement.

Figure 5:
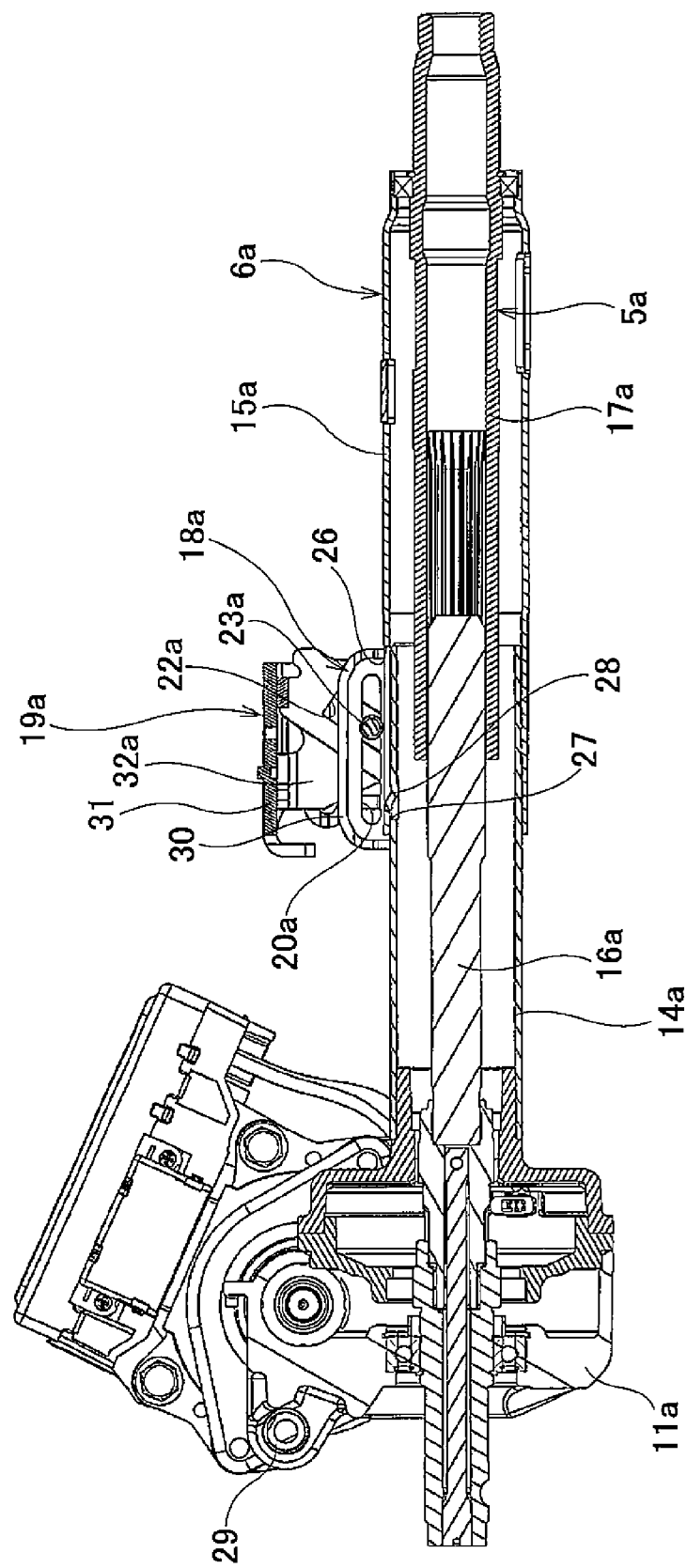
FIG. 5 is a cross sectional view illustrating a state in which the front end edge of an engaging long hole comes in contact with an engaging piece, before the steering apparatus in FIG. 1 is assembled in a vehicle body, or after a secondary collision.
Figure 6:
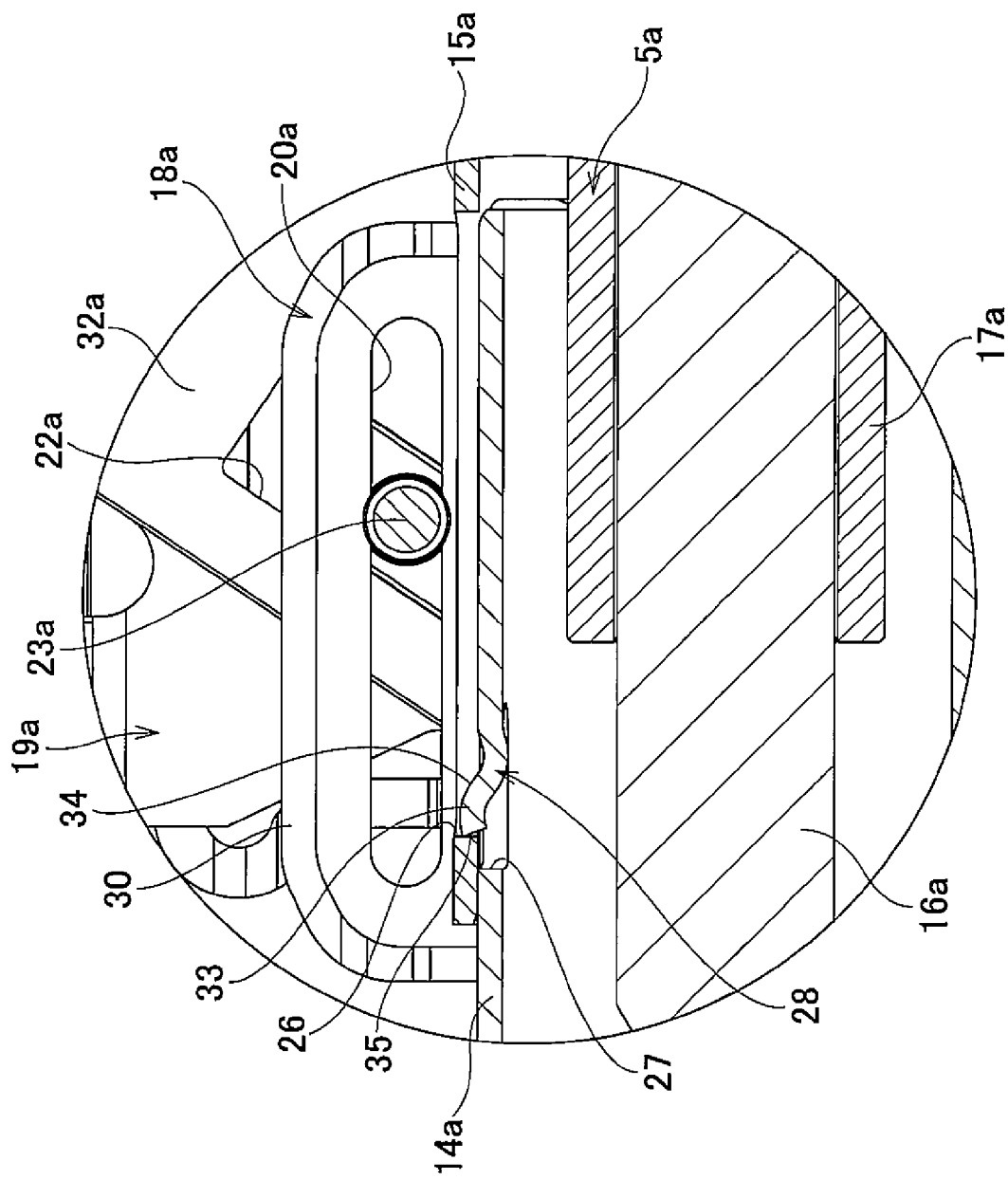
FIG. 6 is an enlarged view of the center part of FIG. 5.
Figure 7:
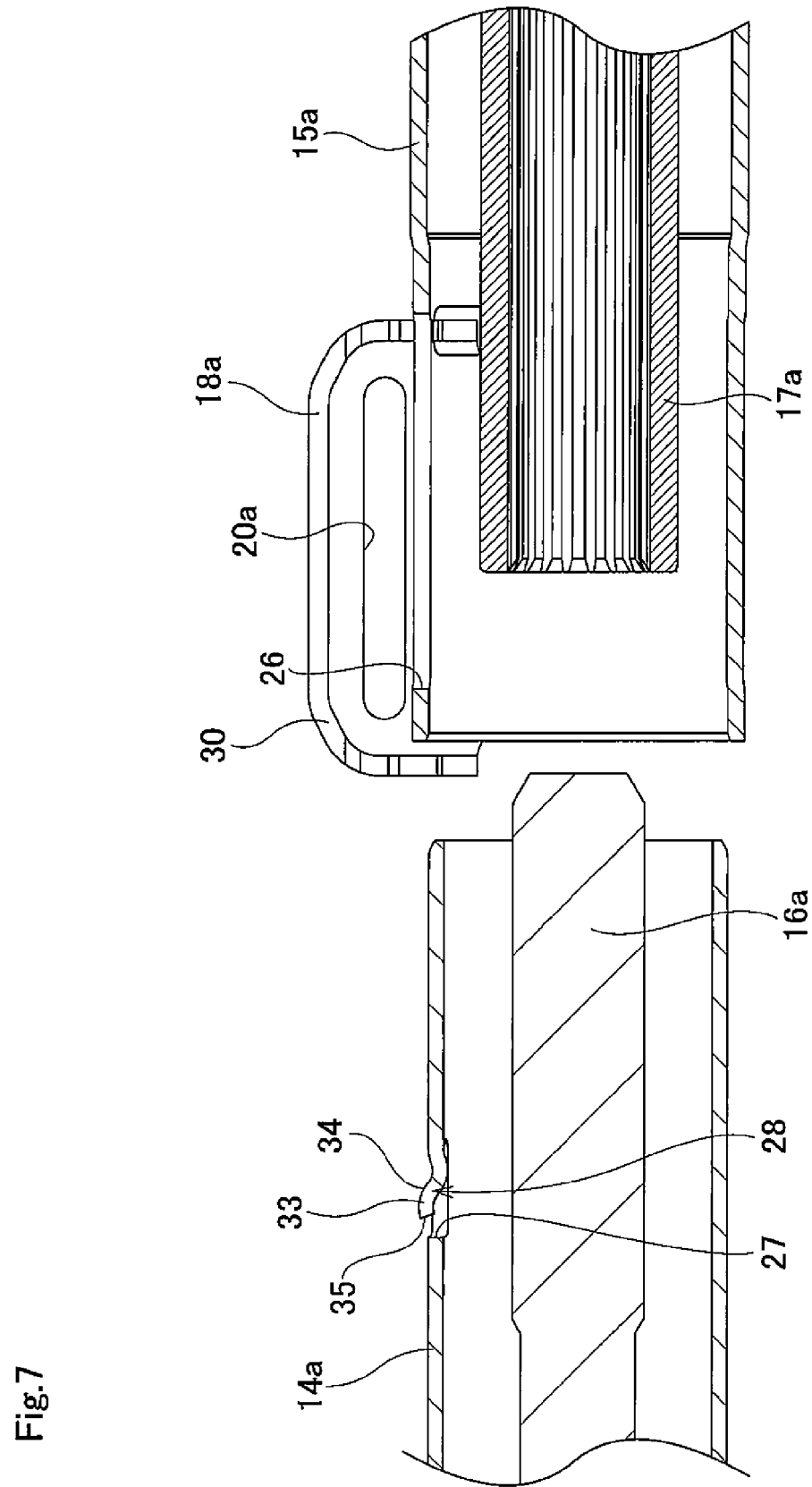
FIG. 7 is a partial enlarged cross sectional view of the inner column and outer column of the steering apparatus in FIG. 1, and illustrates the state just before the end sections of these columns are fitted together.
Figure 8:
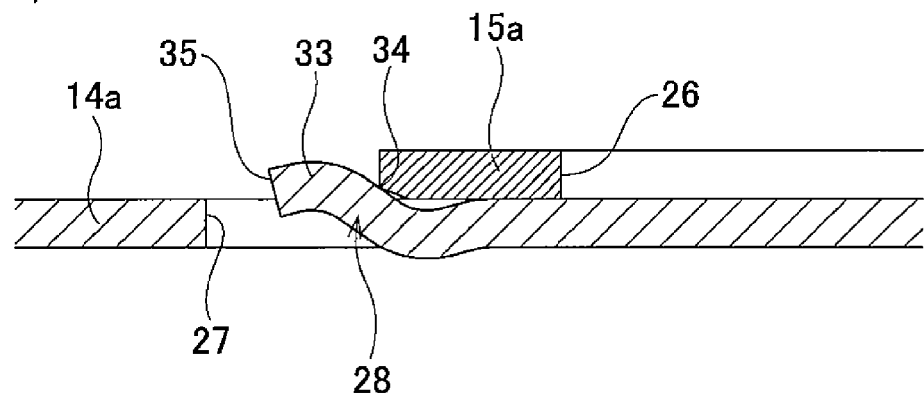
FIG. 8A to FIG. 8C are enlarged cross sectional views illustrating the procedure over time of the work of engaging the long engaging hole and engaging piece when fitting the end sections of the inner column and outer column together.
Figure 8:
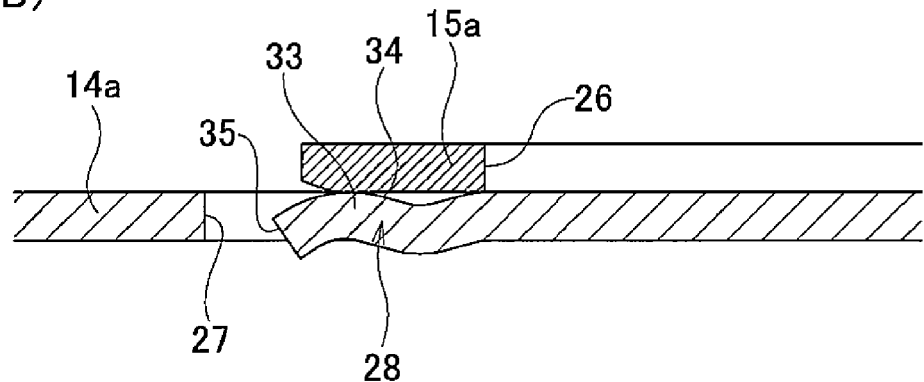
Figure 8:
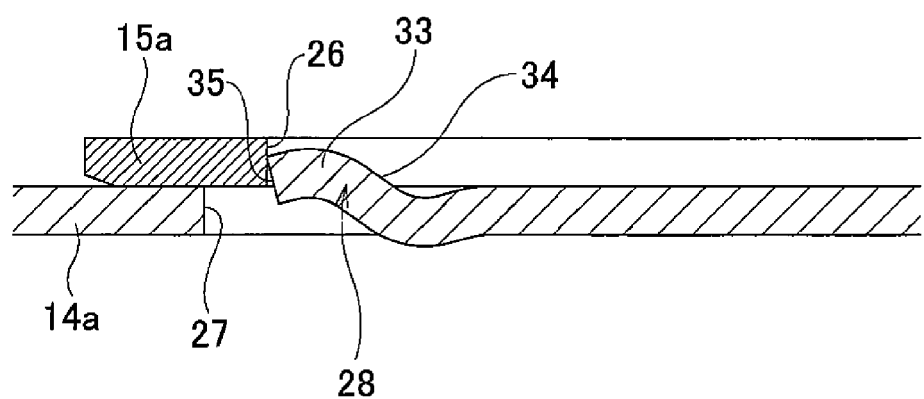
Figure 9:
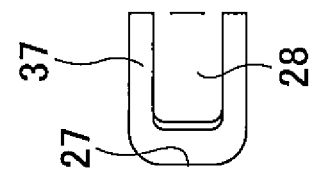
FIG. 9A and FIG. 9B illustrate two examples of an engaging piece that can be applied to the steering column of the present invention; where FIG. 9A(a) is an enlarged cross sectional view of an engaging piece that is formed from the inside portion of a U-shaped cut.
Figure 9:
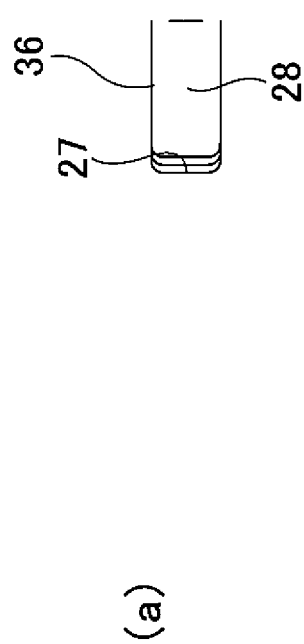
Figure 9:
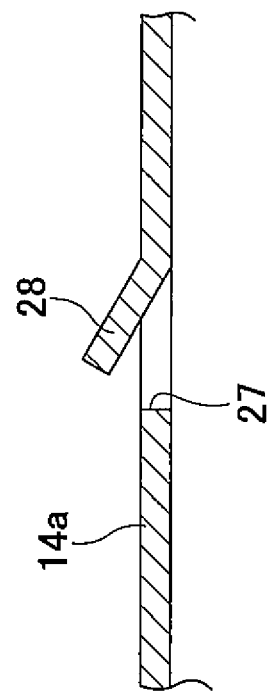
Figure 9:
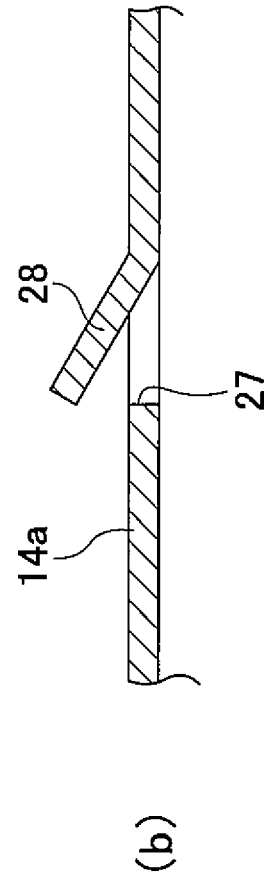
Figure 10:
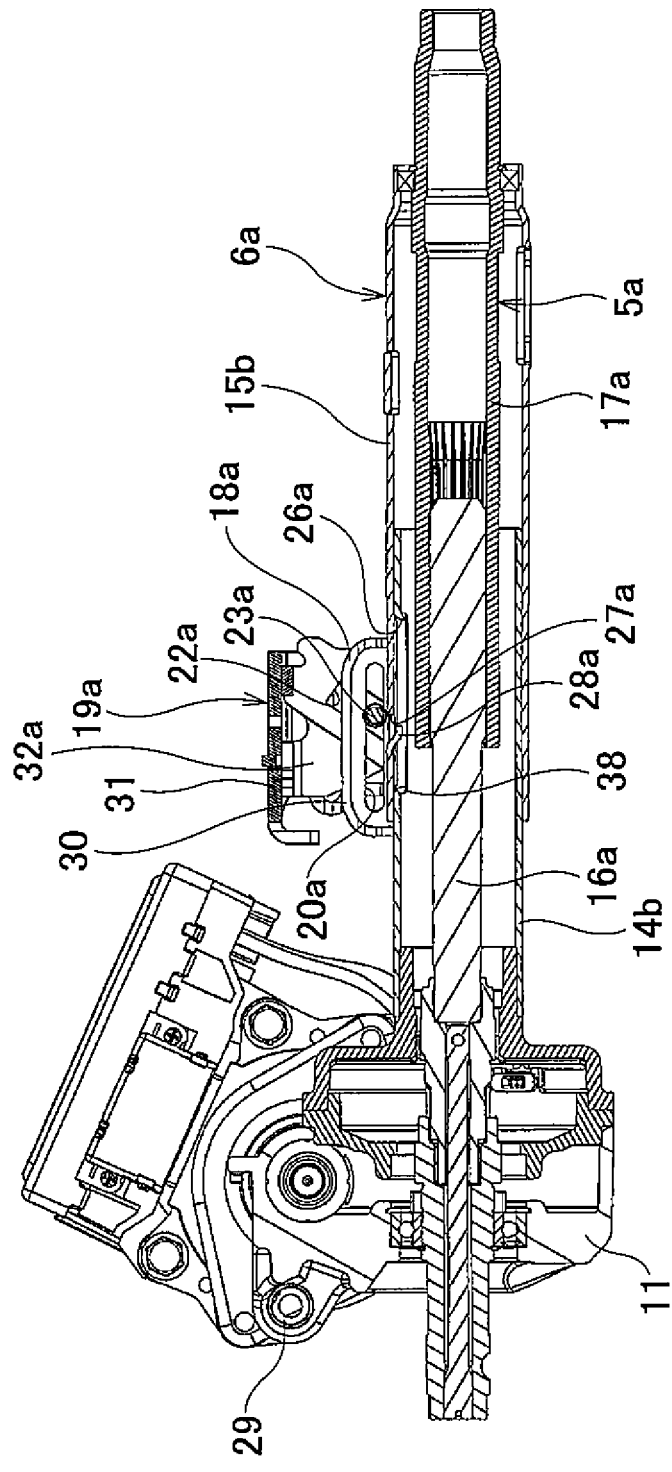
FIG. 10 is a cross sectional view of a steering apparatus of a second example of an embodiment of the present invention, and illustrates the state in which the steering apparatus is assembled in a vehicle body.
Figure 11:
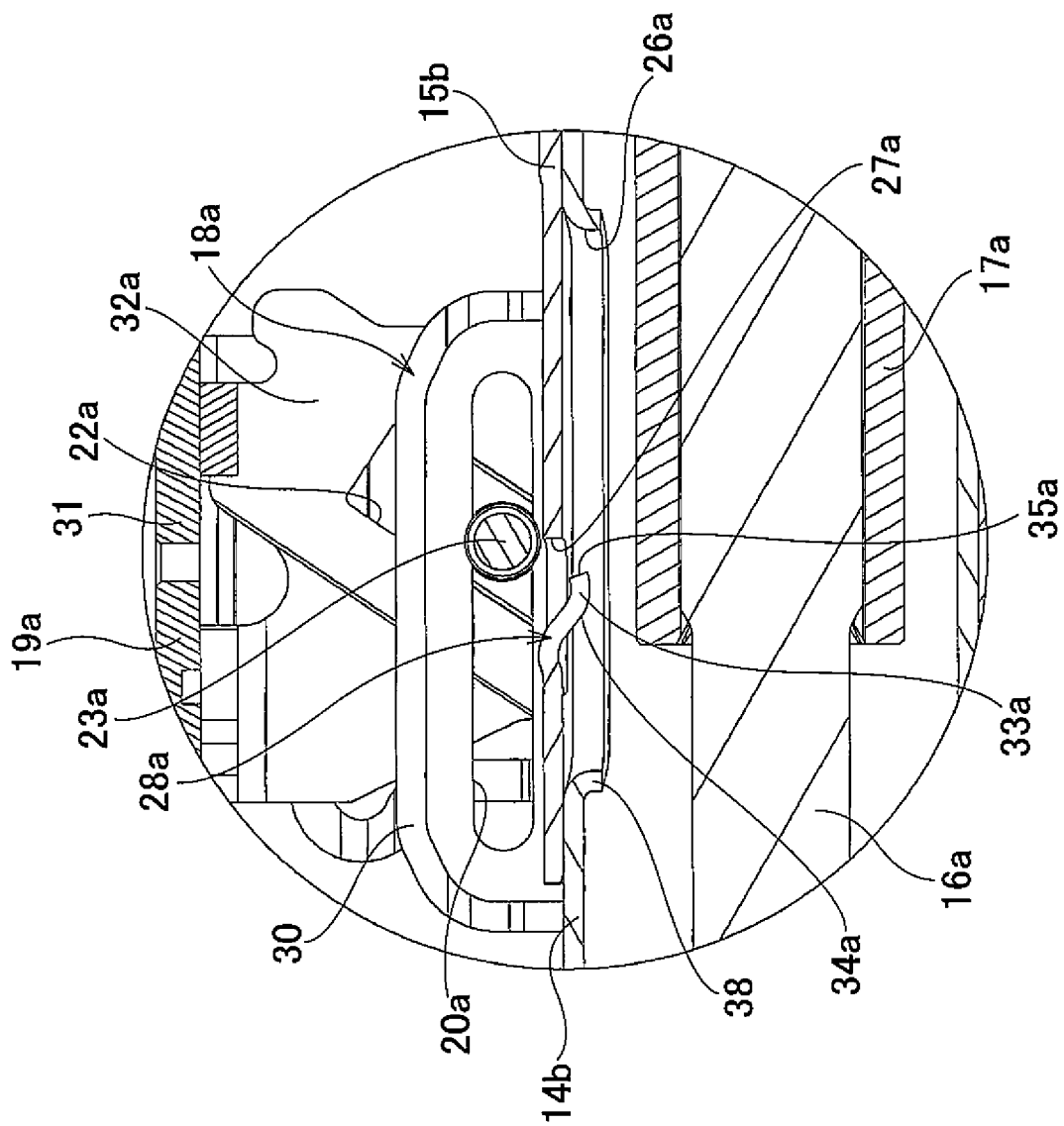
FIG. 11 is an enlarged view of the center part of FIG. 10.
Figure 12:
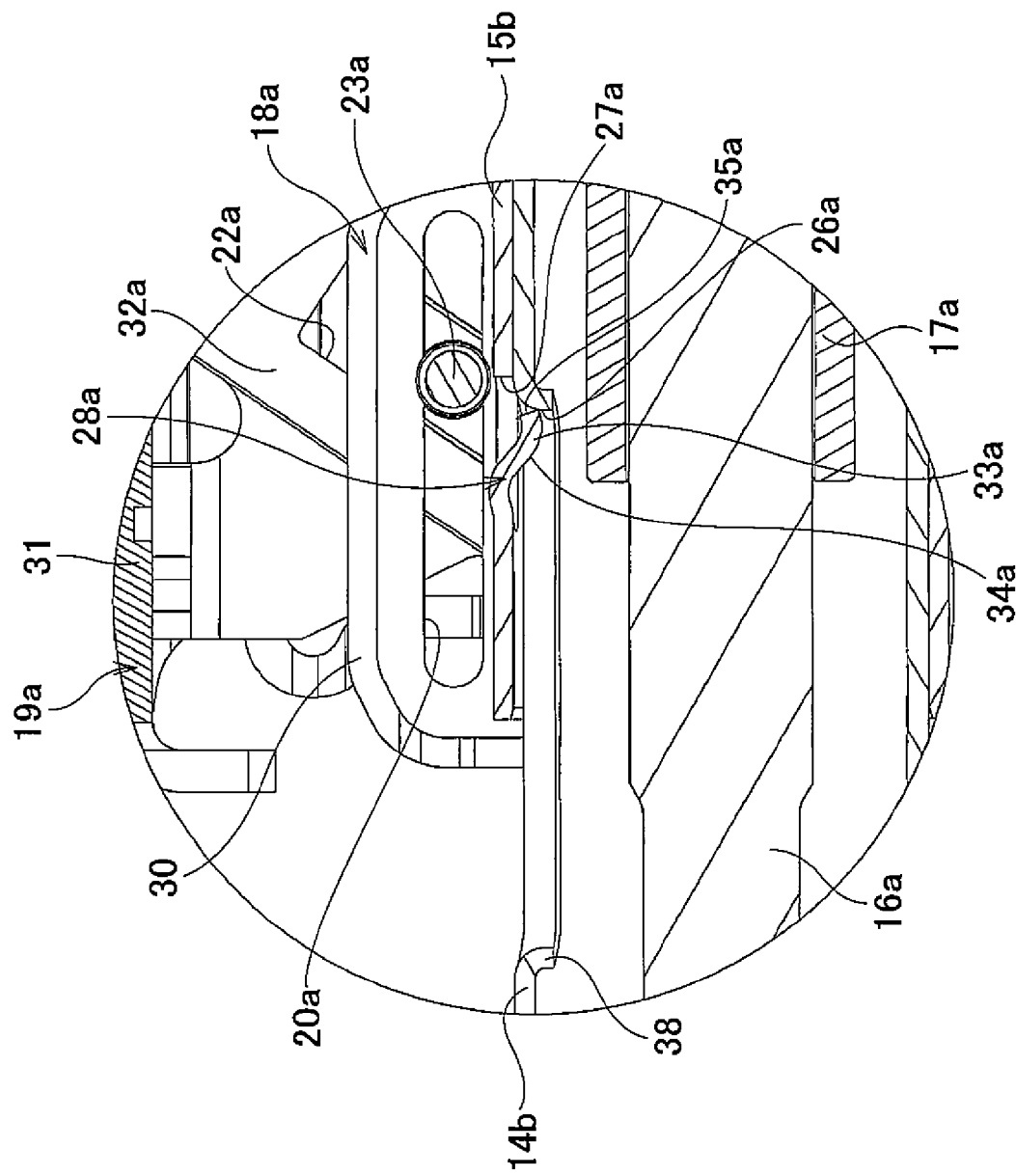
FIG. 12 is a view similar to FIG. 11 illustrating a state in which the rear end edge of the engaging long hole comes in contact with the engaging piece, before the steering wheel in FIG. 10 is assembled in a vehicle body, or after a secondary collision.
Figure 13:
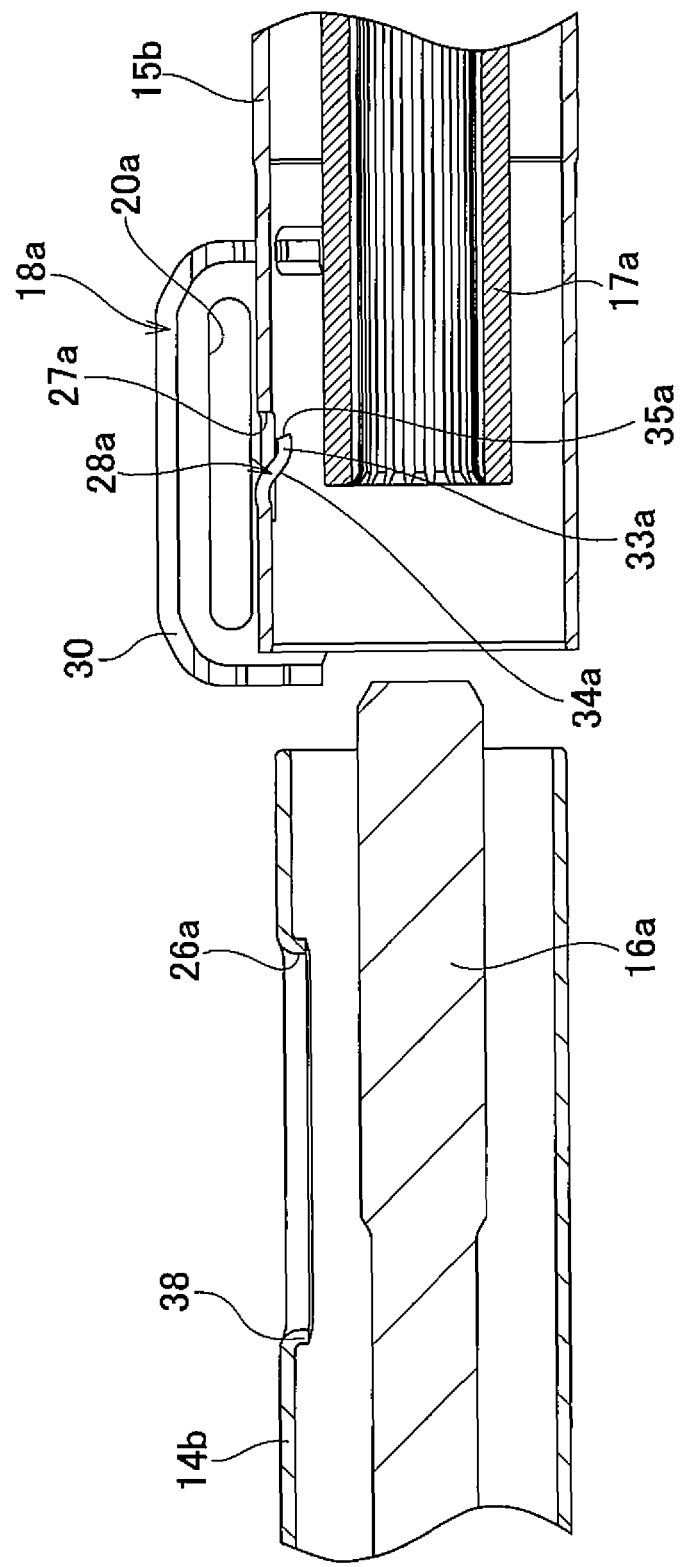
FIG. 13 is a partial enlarged cross sectional view of the inner column and outer column of the steering apparatus in FIG. 10, and illustrates the state just before the end section of the columns are fitted together.

In other words, in this example, in the state before being assembled in the vehicle body or in the state after the support bracket 19a has broken away in the forward direction from the vehicle body due to a secondary collision, the support bracket 19a is able to displace together with the outer column 15a, so relative displacement between the inner column 14a and the outer column 15a is not restricted within the telescopic adjustment range. However, in such a state as well, as illustrated in FIG. 5 and FIG. 6, excessive relative displacement between the inner column 14a and outer column 15a in the direction of extension of the steering column 6a is prevented by the engaging section 35, which is the front end edge of the protruding section 33 of the engaging piece 28, engaging with the front end edge of the tip end side (one end side) of the long engaging hole 26.

Figure 3:
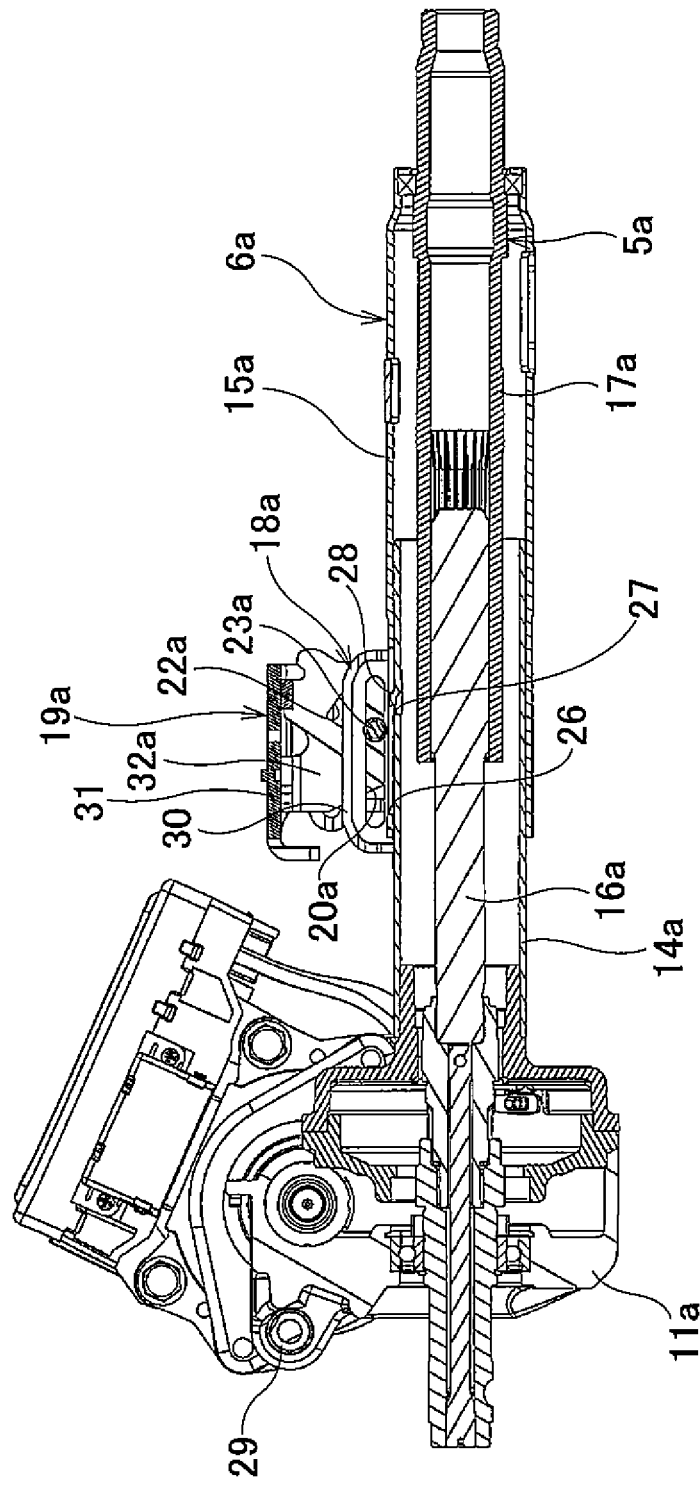
FIG. 3 is a cross sectional view illustrating the state in which the steering apparatus in FIG. 1 is assembled in a vehicle body.
Figure 4:
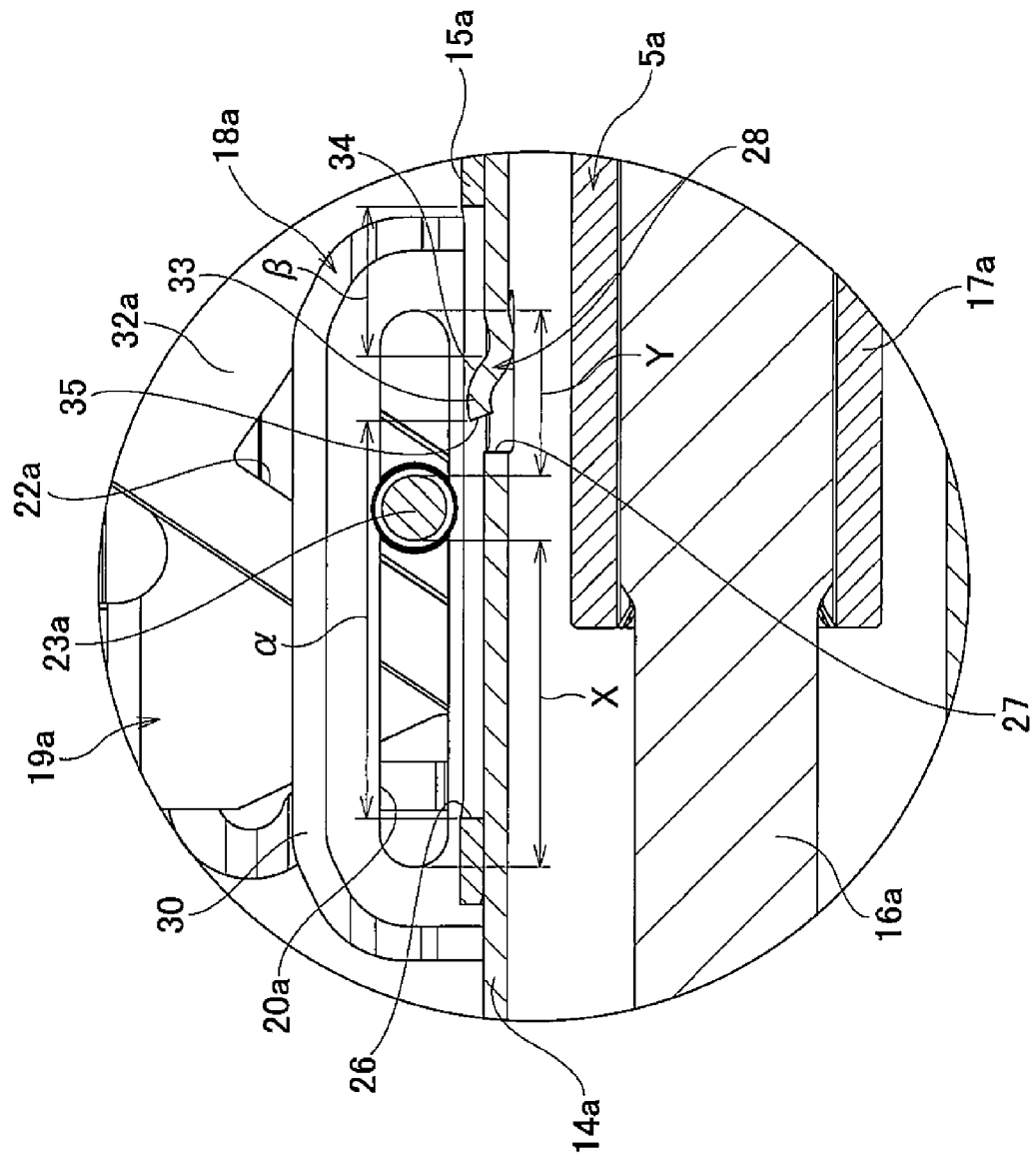
FIG. 4 is an enlarged view of the center part of FIG. 3.

On the other hand, in the assembled state in the vehicle body, the inner column 14a and the outer column 15a are allowed to relatively displace within the telescopic adjustment range due to displacement of the protruding section 33 of the engaging piece 28 along the long engaging hole 26. In other words, as illustrated in FIG. 3 and FIG. 4, in the positional relationship in the assembled state in the vehicle body, regardless of the forward-backward position of the adjustment rod 23a inside the long holes 20a for telescopic adjustment, the positions of formation and the dimensions of the long holes 20a for telescopic adjustment, the adjustment rod 23a, the long engaging hole 26 and the protruding section 33 and inclined section 34 of the engaging piece 28 are regulated so that the dimension a in the axial direction from the front end edge of the long engaging hole 26 to the engaging section 35 of the engaging piece 28 is always equal to or greater than the distance X in the axial direction from the front end edge of the long holes 20a for telescopic adjustment to the adjustment rod 23a ($\alpha \geq X$), and the dimension β in the axial direction from the rear end edge of the long engaging hole 26 to the inclined section 34 of the engaging section 28 is always equal to or greater than the distance Y in the axial direction from the rear end edge of the long holes 20a for telescopic adjustment to the adjustment rod 23a.

Moreover, the long engaging hole 26 is integrally formed with the front section of the outer column 15a, and the receiving hole 27 and engaging piece 28 are integrally formed with the rear section of the inner column 14a. Therefore, by providing the long engaging hole 26, the receiving hole 27 and the engaging piece 28, there is no increase in the number of parts. Furthermore, the work of moving the protruding section 33 of the engaging piece 28 into the long engaging hole 26 can be performed in one process at the same time as the work for assembling the steering column 6a. Therefore, there is no increase in the number of assembly steps due to adding the work of moving the protruding section 33 into the long engaging hole 26.

When providing the long engaging hole 26 in the front section of the outer column 15a as in this example, by providing a long circumferential slit in the circumferential direction in the portion near the front end of the outer column 15a except in the portion on the opposite side in the radial direction from the long hole engaging hole 26, and opening up the middle section of the circumferential slit on the front end edge (end edge on the tip end side of the outer column 15a) of the long engaging hole 26, it is possible to elastically expand or contract the front section of the outer column 15a. In doing so, it is possible to elastically expand or contract the front section of the outer column 15a due to the increase or reduction of the space between the pair of pressure sections 24a, 24b that are provided on both end sections of the adjustment rod 23a, and as this happens, it is possible to increase or reduce the surface pressure at the area of contact between the inner circumferential surface of the front section of the outer column 15a and the outer circumferential surface of the rear section of the inner column 14a. As a result, the force for maintaining the adjusted position of the steering wheel 1 is increased. In this case, as seen from the long engaging hole 26 side, the far end surface of the circumferential slit in the lengthwise direction of the long engaging hole 24 functions as the front end edge of the long engaging hole 26 (end edge on the tip end side of the outer column 15a), and this construction as well is within the scope of the present invention.

Second Example

FIG. 10 to FIG. 13 illustrate a second example of an embodiment of the present invention. When compared with the construction of the first example, in this example, the relationship of the arrangement of the long engaging hole 26a and the receiving hole 27a and engaging piece 28a are inside and outside reversed in the radial direction. In other words, a long engaging hole 26a is provided in the center section in the width direction of the upper rear section of the inner column 14b, and a receiving hole 27a and engaging piece 28a are provided in the center section in the width direction of the upper front section of the outer column 15b. Moreover, in this example, a bent-up section 38 that is formed by bending upward the inner diameter side of the inner column 14b, is formed on the inner peripheral edge of the long engaging hole 26a by a burring process, and this bent-up section 38 increases the strength and rigidity of the portion in the rear end section of the inner column 14b where the long engaging hole 26a is formed. In this example, the inner column 14b corresponds to the front side column of the present invention, and the rear section of the inner column 14b corresponds to one of the rear section of the front side column and the front section of the rear side column of the present invention. Moreover, the outer column 15b corresponds to the rear side column of the present invention, and the front section of the outer column 15b corresponds to the other of the rear section of the front side column and the front section of the rear side column of the present invention.

In other words, the rear end edge of the long engaging hole 26a that is provided in the rear section of the inner column 14b (end edge on the tip end side of the inner column 14b) engages with the engaging piece 28a that is provided on the front section of the outer column 15b. More specifically, the long engaging hole 26a is formed in the rear section of the inner column 14b so as to extend in the axial direction; the engaging piece 28a comprises a protruding section 33a that protrudes in the radial direction of the inner circumferential surface of the outer column 15b on the inner column 14b side; the protruding section 33a moves into the long engaging hole 26a and is able to displace along the long engaging hole 26a within the telescopic adjustment range; and the protruding section 33a is able to engage with the rear end edge of the long engaging hole 26a. Furthermore, a receiving hole 27a is formed in the front section of the outer column 14b, and the engaging piece 28a is integrally formed with the outer column 14b in a state so as to be continuous with the front end edge of the inner peripheral edge of the receiving hole 27a (end edge on the tip end side of the outer column 14b); an inclined section 34a that inclines in a direction such that the amount of protrusion in the radial direction from the receiving hole 27a becomes less going toward the front end side (tip end side of the outer column 14b) is provided on a portion of the front end side of the bottom surface of the protruding section 33a (part of the tip end side of the outer column 14b); an engaging section 35a that is capable of engaging with the rear end edge of the long engaging hole 26a is provided on the rear end edge of the protruding section 33a (part of the base end side of the outer column 14b); and the engaging piece 28a is constructed such that the protruding section 33a is able to move out of the way into the receiving hole 27a due to elastic deformation. The other construction and functions are the same as in the first example.

Figure 14A:
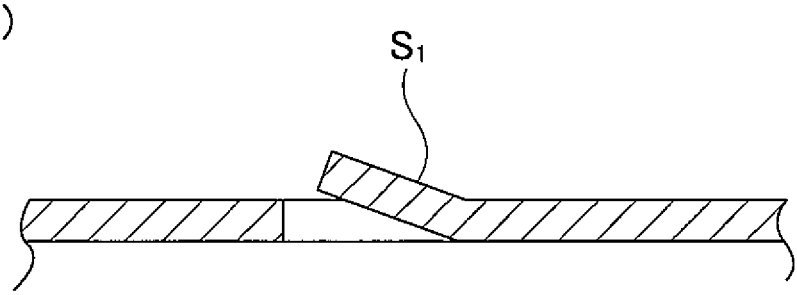
FIG. 14A to FIG. 14C are cross sectional views illustrating three other examples of an engaging piece that can be applied to the steering column of the present invention.
Figure 14B:
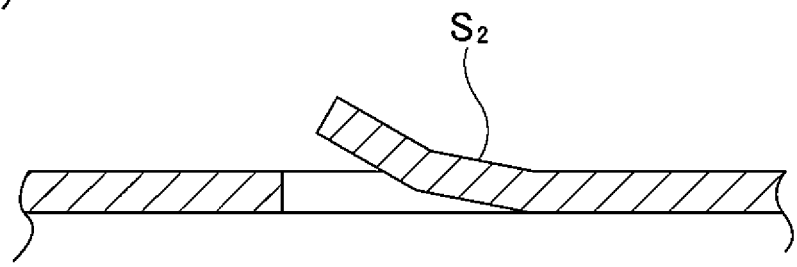
Figure 14C:
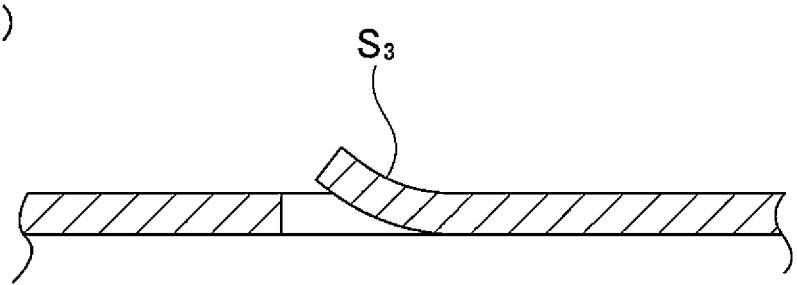
Figure 15:
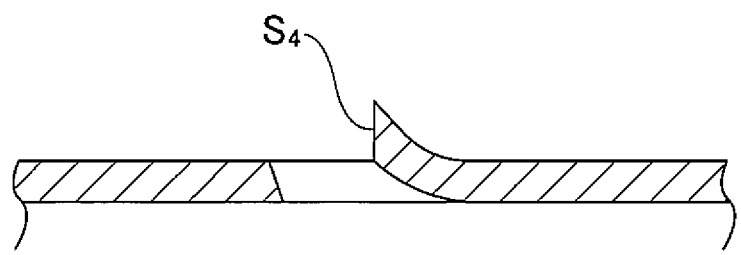
FIG. 15 is a cross sectional view illustrating another example of an engaging piece that can be applied to the steering column of the present invention.
Figure 16:
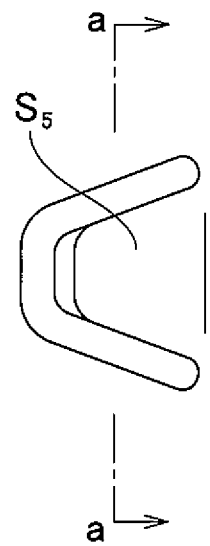
FIG. 16A is a top view illustrating another example of an engaging piece that can be applied to the steering column of the present invention.
FIG. 16B is cross sectional view of section a-a in FIG. 16A.
Figure 16:

In the present invention, an appropriate shape can be applied for the engaging piece. For example, a straight shape $S_1$ such as illustrated in FIG. 14A, a V shape $S_2$ that is bent in the middle section such as illustrated in FIG. 14B, or a curved concave shape $S_3$ such as illustrated in FIG. 14C can be applied for the cross sectional shape of the inclined section that is provided on the engaging piece. By applying a V shape $S_2$ or curved concave shape $S_3$ for the cross sectional shape of the inclined section that is provided on the engaging piece, it is possible to reduce the angle of inclination on the base end side, so when assembling the steering column, it becomes easier for the tip end section of the opposing column where the long engaging hole is provided to ride up onto the engaging piece. In regards to the shape of the engaging section that is provided on the tip end section of the engaging piece, it is possible to increase the stopper strength when coming in contact with the edge on the end of the long engaging hole by applying a flat shape $S_4$ that is orthogonal to the center axis of the steering column as illustrated in FIG. 15. Furthermore, the strength of the engaging piece can also be increased by applying a trapezoidal shape $S_5$ having a width on the base end side that is wider than the width on the tip end side for the planar shape of the engaging piece (shape as seen in the radial direction of the steering column) as illustrated in FIG. 16A. It is also possible to increase the strength of the engaging piece by using an engaging piece having an arc shape $S_6$ such as illustrated in FIG. 16B as the shape of a cross section that cuts through a virtual plane that is orthogonal to the center axis of the steering column (cross sectional shape of section a-a in FIG. 16A).

When embodying the present invention, it is also possible to form the engaging piece after fitting together the rear section of the front side column and the front section of the rear side column. In this case, at the same time the engaging piece is being formed, a part of the engaging piece is moved into the long engaging hole. Therefore, in this case it is not necessary for the engaging piece to have elasticity.

Moreover, the present invention is not limited to construction in which the front side column is the inner column and the rear side column is the outer column, and the invention can also be applied to construction in which the front side column is the outer column and the rear side column is the inner column. In case of this construction as well, two embodiments are possible by differing the columns where the long engaging hole and the engaging piece are located. Furthermore, the positions in the circumferential direction where the long engaging hole and the engaging piece are formed on the steering column are not limited to the positions in the example illustrated in the figures, and can be appropriately changed within a range that does not obstruct other mechanisms. When the column on the side where the engaging piece is provided is a light alloy die-cast molded part, the engaging piece can also be formed at the same time that the column is being die-cast molded.

INDUSTRIAL APPLICABILITY

The present invention can be applied not only to the steering column of a tilt and telescopic steering apparatus comprising both a telescopic mechanism and a tilt mechanism, but can also be wide applied to a steering column for a telescopic steering apparatus that comprises only a telescopic mechanism and to a steering apparatus that comprises a telescopic function.

EXPLANATION OF REFERENCE NUMBERS

1 Steering wheel
2 Steering gear unit
3 Input shaft
4 Tie rod
5, 5a Steering shaft
6, 6a Steering column
7 Universal joint
8 Intermediate shaft
9 Universal joint 10 Electric motor
11, 11a Housing
12 Vehicle body
13 Pivot shaft
14, 14a, 14b Inner column
15, 15a, 15b Outer column
16, 16a Inner shaft
17, 17a Outer shaft
18, 18a Displacement bracket
19, 19a Support bracket
20, 20a Long hole for telescopic adjustment
21 Support plate
22, 22a Long hole for tilt adjustment
23, 23a Adjustment rod
24a, 24b Pressure section
25 Adjustment lever
26, 26a Long engaging hole
27, 27a Receiving hole
28, 28a Engaging piece
29 Support tube
30 Supported pieces
31 Installation plate section
32a, 32b Support plate section
33, 33a Protruding section
34, 34a Inclined section
35, 35a Engaging section
36 Cut
37 Through hole
38 Bent-up section

What is claimed is:

1. A steering column comprising:
a front side column and a rear side column;
the steering column constructed by fitting together a rear section of the front side column, which is a tip end section thereof, and a front section of the rear side column, which is a tip end section thereof, so that relative displacement in an axial direction thereof is possible;
with the steering column assembled in a vehicle body, a range in which the front side column and the rear side column can displace relative to each other in the axial direction, being regulated to a specified range;
in a state before the steering column is assembled in the vehicle body, or in a state after a secondary collision, excessive relative displacement in the axial direction between the front side column and the rear side column being prevented by an end edge on the tip end side of a long engaging hole that is provided in the tip end section of one of the front side column and rear side column engaging with an engaging piece that is provided in the tip end section of the other of the front side column and rear side column;
the long engaging hole is formed in the tip end section of the one of the front side column and rear side column so as to extend in the axial direction;
the engaging piece comprises a protruding section that protrudes in a radial direction from a circumferential surface on a side of the one of the front side column and the rear side column of the tip end section of the other of the front side column and rear side column;
the protruding section moves into the long engaging hole so as to be able to displace along the long engaging hole within a specified range; and
the protruding section is able to engage with the end edge on the tip end side of the long engaging hole.

2. The steering column according to claim 1, wherein
a receiving hole is formed in the tip end section of the other of the front side column and rear side column;
the engaging piece is integrally provided with the tip end section of the other of the front side column and rear side column, with being continuous with part of an inner peripheral edge of the receiving hole;
an inclined section is provided on part of the tip end side of the protruding section and is inclined such that the protruding amount in the radial direction from the receiving hole becomes smaller going toward the tip end side;
an engaging section is provided on part of a base end side of the protruding section so as to be able to engage with the end edge on the tip end side of the long engaging hole; and
the engaging piece is constructed so that the protruding section is able to move out of a way into the receiving hole due to elastic deformation.

3. The steering column according to claim 2, wherein the end edge of the base end side of the protruding section is inclined with respect to a virtual plane that is orthogonal to the axial direction of the rear side column, and the engaging section of the protruding section comes in linear contact when engaging with the end edge on the tip end side of the long engaging hole.

4. The steering column according to claim 1, wherein the engaging piece is formed by bending a portion that is formed on the tip end section of the other of the front side column and rear side column and that is surrounded on three sides by a U-shaped cut or through hole that is opened in the tip end side, and the end edge on the tip end side of the engaging piece is joined with the end edge on the tip end side of the inner peripheral edge of the receiving hole.

5. A telescopic steering apparatus comprising:
a steering column comprising
a front side column and a rear side column;
the steering column constructed by fitting together a rear section of the front side column, which is a tip end section thereof, and a front section of the rear side column, which is a tip end section thereof, so that relative disslacement in an axial direction thereof is possible;
with the steering column assembled in a vehicle body, a range in which the front side column and the rear side column can displace relative to each other in the axial direction, being regulated to a specified range; and
in a state before the steering column is assembled in the vehicle body, or in a state after a secondary collision, excessive relative displacement in the axial direction between the front side column and the rear side column being prevented by an end edge on the tip end side of a long engaging hole that is provided in the tip end section of one of the front side column and rear side column engaging with an engaging piece that is provided in the tip end section of the other of the front side column and rear side column;
a steering shaft supported on an inner diameter side of the steering column so as to be able to rotate freely, and comprising a rear end section which protrudes from a rear end opening of the steering column, such that a steering wheel can be supported by and fastened to the rear section; the steering shaft being constructed by fitting the rear section of a front side shaft that is supported on the inner diameter side of the front side column so as to only be able to rotate with the front section of a rear side shaft that is supported on the inner diameter side of the rear side column so as to only be able to rotate, so that torque can be transmitted and so that relative displacement in the axial direction is possible;

a displacement bracket fastened to part of the rear side column and comprising a long hole for telescopic adjustment that penetrates the displacement bracket in the width direction, and extends in the axial direction of the rear side column;

a support bracket supported by a vehicle body, and comprising a pair of support plates that hold the displacement bracket from both sides in the width direction, and a pair of through holes that are provided in portions of the pair of support plates that are aligned with each other;

an adjustment rod arranged so as to be inserted in the width direction through the pair of through holes and the long hole for telescopic adjustment;

a pair of pressure sections provided on portions of both end sections of the adjustment rod that protrude from outside surfaces of the pair of support plates; and an adjustment lever provided in one end section of the adjustment rod, and increases or decreases a space between the pair of pressure sections by rotating around the adjustment rod, or rotating together with the adjustment rod; and with the space between the pair of pressure sections being increased, the adjustment rod being able to displace inside the long hole for telescopic adjustment which defines the specified range.

6. A telescopic steering apparatus comprising:
a steering column comprising
  a front side column and a rear side column;
  the steering column constructed by fitting together a rear section of the front side column, which is a tip end section thereof, and a front section of the rear side column, which is a tip end section thereof, so that relative displacement in an axial direction thereof is possible;
  with the steering column assembled in a vehicle body, a range in which the front side column and the rear side column can displace relative to each other in the axial direction, being regulated to a specified range;
  in a state before the steering column is assembled in the vehicle body, or in a state after a secondary collision, excessive relative displacement in the axial direction between the front side column and the rear side column being prevented by an end edge on the tip end side of a long engaging hole that is provided in the tip end section of one of the front side column and rear side column engaging with an engaging piece that is provided in the tip end section of the other of the front side column and rear side column;
  the long engaging hole is formed in the tip end section of the one of the front side column and rear side column so as to extend in the axial direction;
  the engaging piece comprises a protruding section that protrudes in a radial direction from a circumferential surface on a side of the one of the front side column and the rear side column of the tip end section of the other of the front side column and rear side column;
  the protruding section moves into the long engaging hole so as to be able to displace along the long engaging hole within a specified range; and
  the protruding section is able to engage with the end edge on the tip end side of the long engaging hole;

a steering shaft supported on an inner diameter side of the steering column so as to be able to rotate freely, and comprising a rear end section which protrudes from a rear end opening of the steering column, such that a steering wheel can be supported by and fastened to the rear section; the steering shaft being constructed by fitting the rear section of a front side shaft that is supported on the inner diameter side of the front side column so as to only be able to rotate with the front section of a rear side shaft that is supported on the inner diameter side of the rear side column so as to only be able to rotate, so that torque can be transmitted and so that relative displacement in the axial direction is possible;

a displacement bracket fastened to part of the rear side column and comprising a long hole for telescopic adjustment that penetrates the displacement bracket in the width direction, and extends in the axial direction of the rear side column;

a support bracket supported by a vehicle body, and comprising a pair of support plates that hold the displacement bracket from both sides in the width direction, and a pair of through holes that are provided in portions of the pair of support plates that are aligned with each other;

an adjustment rod arranged so as to be inserted in the width direction through the pair of through holes and the long hole for telescopic adjustment;

a pair of pressure sections provided on portions of both end sections of the adjustment rod that protrude from outside surfaces of the pair of support plates; and an adjustment lever provided in one end section of the adjustment rod, and increases or decreases a space between the pair of pressure sections by rotating around the adjustment rod, or rotating together with the adjustment rod; and with the space between the pair of pressure sections being increased, the adjustment rod being able to displace inside the long hole for telescopic adjustment which defines the specified range.

* * * * *